United States Patent
Green, Sr.

(10) Patent No.: US 6,783,147 B1
(45) Date of Patent: Aug. 31, 2004

(54) COOLER CART

(76) Inventor: Morris E. Green, Sr., 8904 Milbrae Ct., Richmond, VA (US) 23236

( * ) Notice: Subject to any disclaimer, the term of this patent is extended or adjusted under 35 U.S.C. 154(b) by 80 days.

(21) Appl. No.: 10/226,001

(22) Filed: Aug. 21, 2002

(51) Int. Cl.$^7$ ................................................ B62B 1/00
(52) U.S. Cl. .................... 280/652; 280/659; 280/47.26; D34/12
(58) Field of Search .............................. 280/652, 47.26, 280/659, 47.33, 47.24, 63, 47.19, 47.23, 47.35, 47.2, 47.131, 30, 32.6, 35, 47.34, 47.371, 87.01, 144, 147, 148, 651, 656; 248/129; D34/12, 24, 25, 26

(56) References Cited

U.S. PATENT DOCUMENTS

| | | | | |
|---|---|---|---|---|
| 1,300,533 A | * | 4/1919 | Wessinger | 248/129 |
| 3,331,613 A | * | 7/1967 | Popelka | 280/35 |
| 4,451,053 A | * | 5/1984 | Alioa et al. | 280/47.26 |
| 4,790,559 A | * | 12/1988 | Edmonds | 280/655 |
| 4,796,909 A | * | 1/1989 | Kirkendall | 280/651 |
| D302,891 S | * | 8/1989 | Lardell | D34/23 |
| 4,976,448 A | * | 12/1990 | Wickersham et al. | 280/47.2 |
| 5,080,387 A | * | 1/1992 | Ryals | 280/645 |
| 5,169,164 A | * | 12/1992 | Bradford | 280/35 |
| 5,249,823 A | * | 10/1993 | McCoy et al. | 280/656 |
| 5,299,817 A | * | 4/1994 | Chang | 280/35 |
| 5,313,817 A | * | 5/1994 | Meinders | 62/457.1 |
| D358,921 S | * | 5/1995 | Abbema | D34/26 |
| 5,465,996 A | * | 11/1995 | Wisz | 280/651 |
| 5,599,031 A | * | 2/1997 | Hodges | 280/79.11 |
| 5,779,252 A | * | 7/1998 | Bolton, Jr. | 280/47.371 |
| 5,826,893 A | * | 10/1998 | Snoeyenbos | 280/43 |
| 6,109,625 A | * | 8/2000 | Hewitt | 280/43.24 |
| 6,109,644 A | * | 8/2000 | Cox | 280/652 |
| 6,471,237 B1 | * | 10/2002 | Bedsole | 280/655 |

* cited by examiner

Primary Examiner—Brian L. Johnson
Assistant Examiner—J. Allen Shriver

(57) ABSTRACT

Cooler carts are desirable for transporting coolers. Coolers come in various sizes, and can become quite heavy once filled with ice and food or beverages. The cooler cart adapts to a wide range of cooler sizes by having the ability to telescope both lengthwise and widthwise. A telescoping handle shaft is also provided to adjust the height of the handle. All four corners of the cooler cart are supported by either four wheels mounted on the corners or two legs on the front corners and to wheels on the rear corners. The handle shaft is hingedly mounted, allowing it to be folded down when the cooler cart is not in use.

19 Claims, 5 Drawing Sheets

COOLER CART

BACKGROUND OF THE INVENTION

1. Field of the Invention

The present invention relates to a cooler cart for use in connection with coolers. The cooler cart has particular utility in connection with transporting coolers.

2. Description of the Prior Art

Cooler carts are desirable for transporting coolers. Coolers come in various sizes, and can become quite heavy once filled with ice and food and/or beverages. Coolers are often used at sporting events, the beach, or other locations that are significantly removed from the area where transportation is parked. Consequently, coolers frequently must be carried a significant distance. often over soft ground, loose dirt, or sand. Many persons are unable to transport a heavy cooler over a significant distance, especially when the footing is poor. Consequently, it is desirable to have a cooler cart to haul the cooler so that it does not have to be carried. Furthermore, cooler carts adapt to transport a wide variety of cooler sizes.

The use of size variable carts is known in the prior art. For example, U.S. Pat. No. 5,249,823 to McCoy et al. discloses a size variable cart. However, the McCoy et al. '823 patent does not have a hingedly attached handle, and has further drawbacks of lacking a padded grip.

U.S. Pat. No. 5,779,252 to Bolton, Jr. discloses a cooler caddy that transports a cooler. However, the Bolton, Jr. '252 patent does not telescope widthwise, and additionally does not have a padded grip.

Similarly, U.S. Pat. No. Des. 358,921 to Abbema discloses a cooler tote that transports a cooler. However, the Abbema '921 patent does not have a padded grip, and cannot telescope widthwise.

In addition, U.S. Pat. No. 5,465,996 to Wisz discloses a cooler carrier apparatus that transports a cooler. However, the Wisz '996 patent does not have a padded grip, and also does not telescope widthwise.

Furthermore, U.S. Pat. No. 5,169,164 to Bradford discloses a cooler tote that transports a cooler. However, the Bradford '164 patent does not have a padded grip, and further lacks the ability to telescope widthwise.

Lastly, U.S. Pat. No. 4,451,053 to Alioa et al. discloses a handcart that transports a load. However, the Alioa et al. '053 patent does not telescope widthwise, and has the additional deficiency of lacking a hingedly attached handle.

While the above-described devices fulfill their respective, particular objectives and requirements, the aforementioned patents do not describe a cooler cart that allows transporting coolers. The McCoy et al. '823 patent and the Alioa et al. '053 patent make no provision for a hingedly attached handle. The McCoy et al. '823 patent, the Bolton, Jr. '252 patent, the Abbema '921 patent, the Wisz '996 patent, and the Bradford '164 patent lack a padded grip. The Alioa et al. '053 patent, the Bolton, Jr. '252 patent, the Abbema '921 patent, the Wisz '996 patent, and the Bradford '164 patent cannot telescope widthwise.

Therefore, a need exists for a new and improved cooler cart that can be used for transporting coolers. In this regard, the present invention substantially fulfills this need. In this respect, the cooler cart according to the present invention substantially departs from the conventional concepts and designs of the prior art, and in doing so provides an apparatus primarily developed for the purpose of transporting coolers.

SUMMARY OF THE INVENTION

In view of the foregoing disadvantages inherent in the known types of size variable carts now present in the prior art, the present invention provides an improved cooler cart, and overcomes the above-mentioned disadvantages and drawbacks of the prior art. As such, the general purpose of the present invention, which will be described subsequently in greater detail, is to provide a new and improved cooler cart which has all the advantages of the prior art mentioned heretofore and many novel features that result in a cooler cart which is not anticipated, rendered obvious, suggested, or even implied by the prior art, either alone or in any combination thereof.

To attain this, the present invention essentially comprises a handle with one end connected to the middle of a first end member. The first end member has one end connected to one end of a first side member and its opposite end connected to one end of a second side member. A second end member has one end connected to the opposite end of the first side member and its opposite end connected to the opposite end of the second side member. Legs are attached to the bottom of the opposing ends of the first end member and the bottom of the end of said first side member and the bottom of the opposing end of the second side member. Wheels are connected to the bottom of the opposing ends of the second end member and the bottom of the opposing end of the first side member and the bottom of the end of the second side member.

There has thus been outlined, rather broadly, the more important features of the invention in order that the detailed description thereof that follows may be better understood and in order that the present contribution to the art may be better appreciated.

The invention may also include the handle being connected to the first end member by a telescoping handle shaft. The bottom portion of the handle shaft may have handle adjustment holes, and a handle retention pin may be mounted in the top portion of the handle shaft. The handle retention pin may be spring-loaded. The first end member, second end member, first side member, and second side member may be telescoping by means of channels in the inner portion of the first side member, second side member, first end member, and second end member, carriage bolts inserted through the channels, and wing nuts threadedly attached to the carriage bolts. The handle shaft may be hingedly attached to the first end member. The wheels may be of the caster type. The top edge and front edge of the outer portion of the first side member, second side member, first end member, and second end member may comprise flanges into which the inner portion of the first side member, second side member, first end member, and second side member are inserted. The legs may be replaced by additional wheels in the same location. The handle may have a padded grip encircling its top. The first end member, second end member, first side member, and second side member may be L-shaped. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cooler cart that has all of the advantages of the prior art size variable carts and none of the disadvantages.

It is another object of the present invention to provide a new and improved cooler cart that may be easily and efficiently manufactured and marketed.

An even further object of the present invention is to provide a new and improved cooler cart that has a low cost of manufacture with regard to both materials and labor, and which accordingly is then susceptible of low prices of sale to the consuming public, thereby making such cooler cart economically available to the buying public.

Still another object of the present invention is to provide a new cooler cart that provides in the apparatuses and methods of the prior art some of the advantages thereof, while simultaneously overcoming some of the disadvantages normally associated therewith.

Even still another object of the present invention is to provide a cooler cart for transporting coolers. This allows the user to carry a cooler comfortably.

Still yet another object of the present invention is to provide a cooler cart for transporting coolers. This makes it possible to carry coolers of various sizes.

An additional object of the present invention is to provide a cooler cart for transporting coolers. This allows the cooler cart to adjust to the height of the person hauling it.

A further object of the present invention is to provide a cooler cart for transporting coolers. This enables all four corners of the cooler cart to be supported when the cooler cart is at rest.

A still further object of the present invention is to provide a cooler cart for transporting coolers. This permits the handle shaft to be lowered so that the cooler cart occupies less space when stored.

Lastly, it is an object of the present invention to provide a new and improved cooler cart for transporting coolers.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
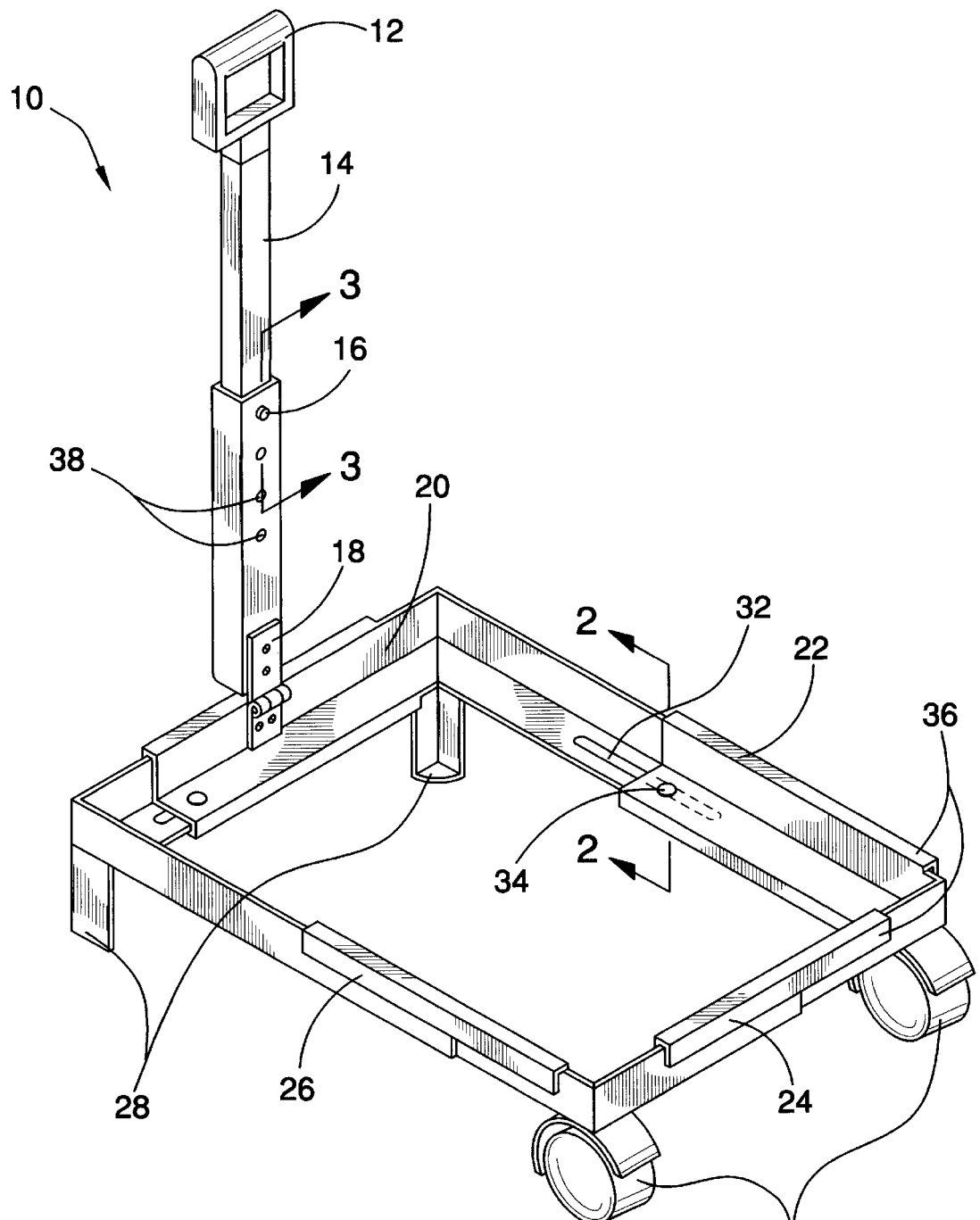
FIG. 1 is a top perspective view of the current embodiment of the cooler cart constructed in accordance with the principles of the present invention.

Referring now to the drawings, and particularly to FIGS. 1–5, a current embodiment of the cooler cart of the present invention is shown and generally designated by the reference numeral 10.

In FIG. 1, a new and improved cooler cart 10 of the present invention for transporting coolers is illustrated and will be described. More particularly, the cooler cart 10 has a handle 12 attached to one end of handle shaft 14. Handle shaft 14 telescopes, and the length of handle shaft 14 is adjusted by the placement of handle retention pin 16 in one of the handle adjustment holes 38. The opposing end of handle shaft 14 is connected to hinge 18. The opposing end of hinge 18 is connected to the middle of first end member 20. First end member 20 telescopes and has first side member 22 connected to one end and second side member 26 connecting to the opposing end. Second end member 24 has its opposing ends connected to first side member 22 and second side member 26 respectively. First side member 22, second side member 26, and second end member 24 telescope. The top edge and the front edge of the upper portion of first end member 20, second end member 24, first side member 22, and second side member 26 form flanges 36. The inner portions of first end member 20, second end member 24, first side member 22, and second side member 26 are inserted into flanges 36. The positions of the inner portions and the outer portions are controlled by the placement of carriage bolts 34 in channels 32. Wheels 30 are attached to the rear corners of the cooler cart 10, and legs 28 are attached to the front corners of the cooler cart 10. Wheels 30 and legs 28 support a load (not shown) transported by cooler cart 10. In the current embodiment, wheels 30 are of the caster type. Handle 12, handle shaft 14, first end member 20, second end member 24, first side member 22, and second side member 26 are made of plastic in the current embodiment. Hinge 18 is made of steel in the current embodiment. Cooler cart 10 is depicted in a ready for use position.

Figure 2:
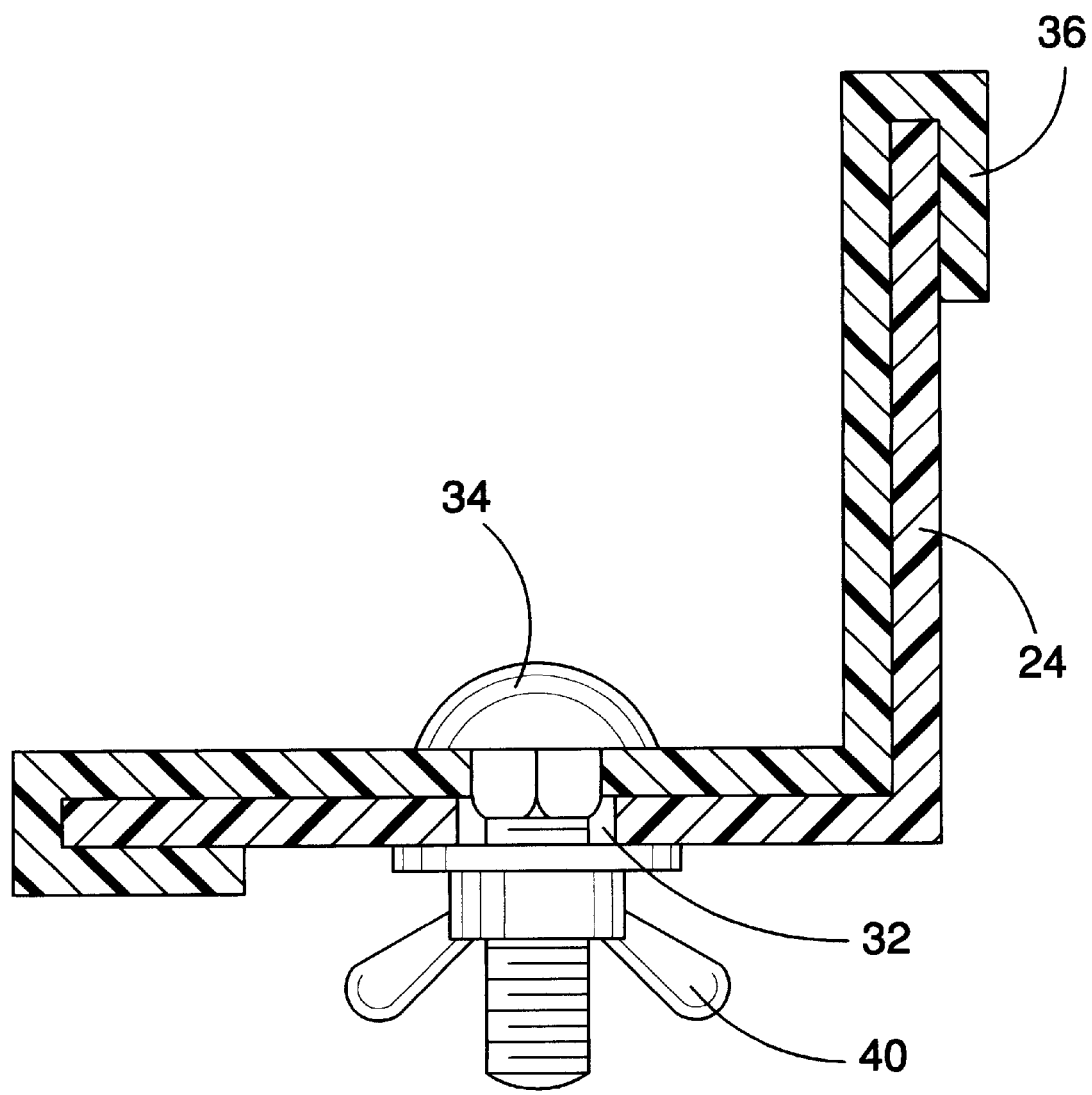
FIG. 2 is a side sectional view of the second end member of the present invention.

Moving on to FIG. 2, a new and improved second end member 24 of the present invention for transporting coolers is illustrated and will be described. More particularly, the second end member 24 has a carriage bolt 34 inserted through channel 32. Wing nut 40 is threadedly attached to carriage bolt 34. The top edge and front edge of the outer portion of second end member 24 end in flanges 36. The length of second end member 24 is determined by the placement of carriage bolt 34 in channel 32. The positions of carriage bolt 34 in channel 32 is maintained by frictionally engaging wing nut 40 and carriage bolt 34 against second end member 24 by tightening wing nut 40.

Figure 3:
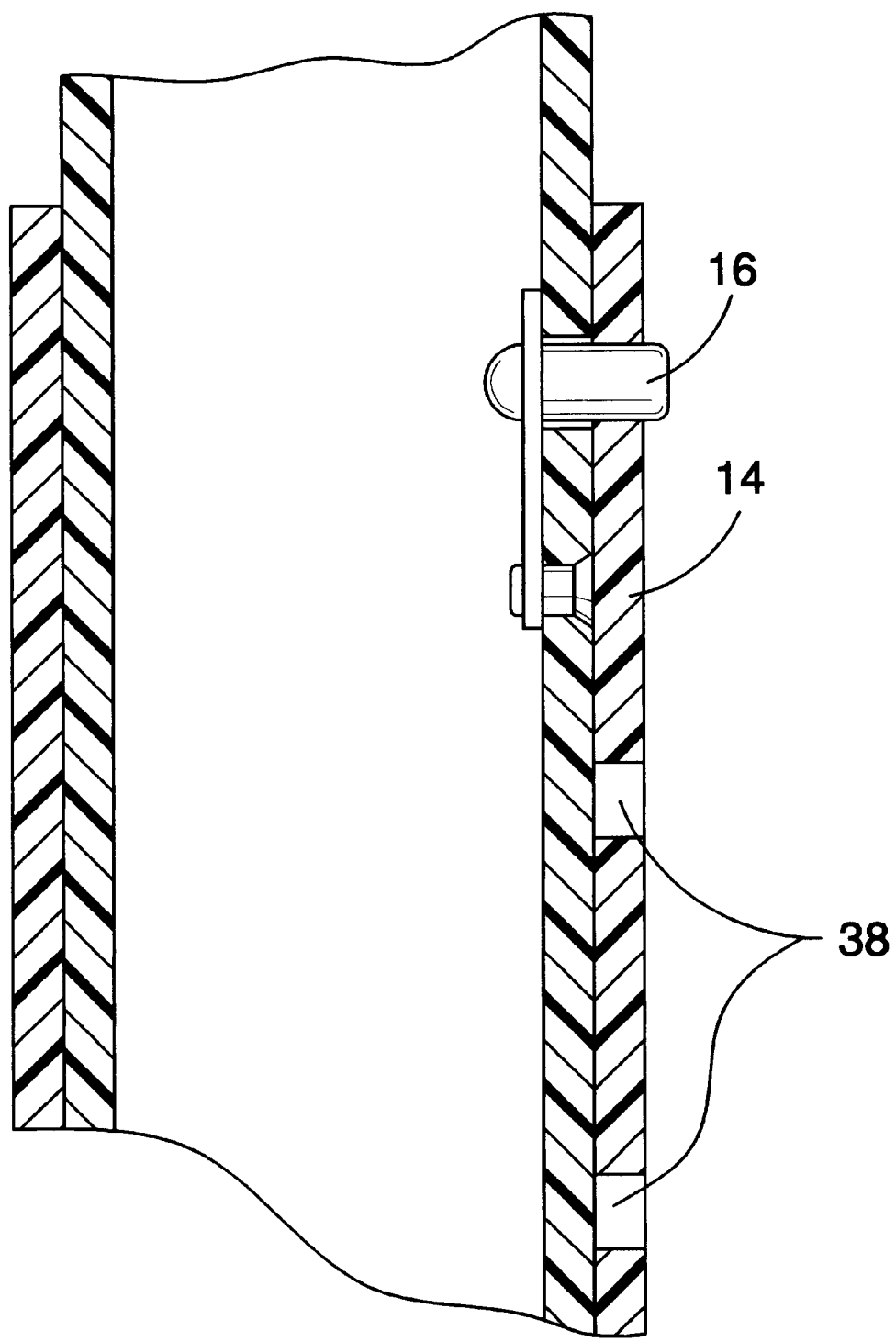
FIG. 3 is a side sectional view of the handle shaft of the present invention.

In FIG. 3, a new and improved handle shaft 14 of the present invention for transporting coolers is illustrated and will be described. More particularly, the handle shaft 14 has a handle retention pin 16 mounted inside of the top portion of handle shaft 14. Handle retention pin 16 protrudes through one of the handle adjustment holes 38. The length of handle shaft 14 is determined by which handle adjustment hole 38 handle retention pin 16 protrudes through. In the current embodiment, handle retention pin 16 is spring-loaded and can be pressed inward so that the top portion of handle shaft 14 can be raised or lowered with respect to the bottom portion of handleshaft 14.

Figure 4:
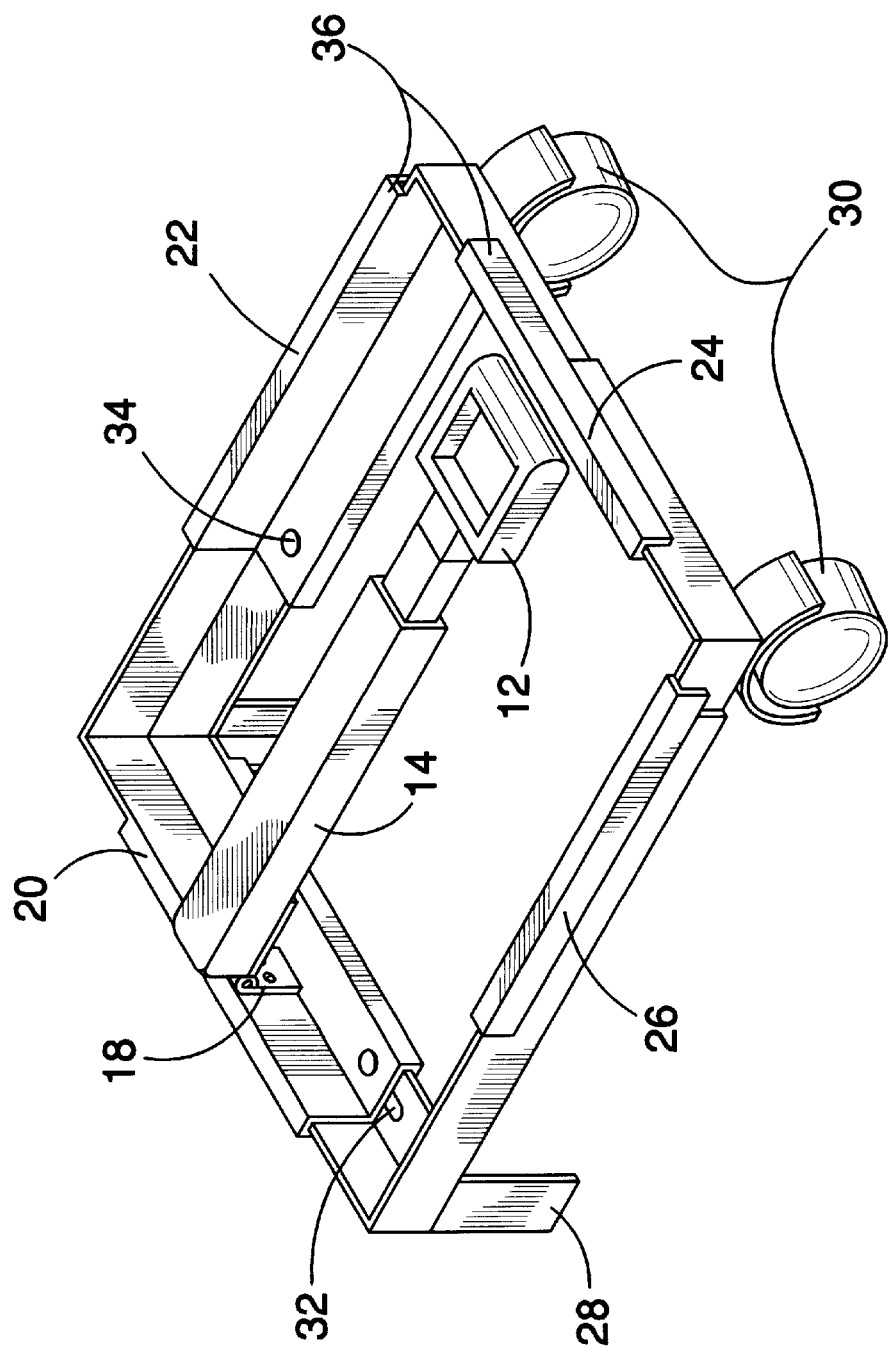
FIG. 4 is a top perspective view of the cooler cart of the present invention.

Continuing with FIG. 4, a new and improved cooler cart 10 of the present invention for transporting coolers is illustrated and will be described. More particularly, the cooler cart 10 has a handle 12 attached to handle shaft 14. Handle shaft 14 is collapsed by rotating hinge 18. First end member 20, second end member 24, first side member 22, and second side member 26 are shown with channel 32 and carriage bolts 34 visible. Flanges 36, wheels 30, and legs 28 are also depicted. The cooler cart 10 is illustrated in a position suitable for storage.

Figure 5:
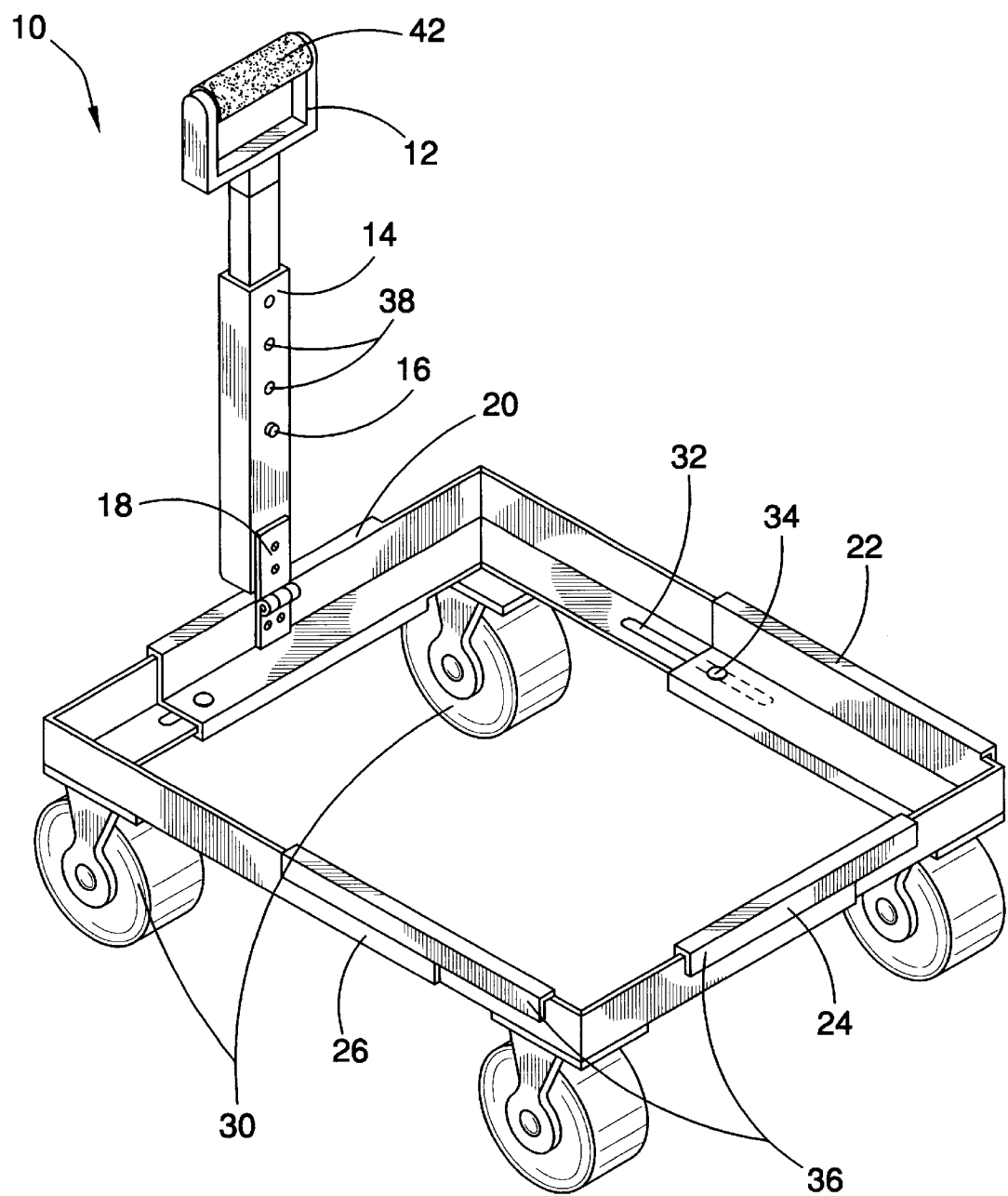
FIG. 5 is a top perspective view of the cooler cart of the present invention.

Concluding with FIG. 5, an alternative embodiment of a new and improved cooler cart 10 of the present invention for transporting coolers is illustrated and will be described. More particularly, the cooler cart 10 has a padded grip 42 encircling the top of handle 12. The handle shaft 14 is shown in a lowered position with handle retention pin 16 protruding from the lowest handle adjustment hole. Hinge 18 is shown attaching handle shaft 14 to first end member 20. Channels 32 and carriage bolts 34 are shown, along with first side member 22, second end member 24, second side member 26, and flanges 36. In this embodiment, all four corners of the cooler cart 10 are supported by wheels 30.

In use, it can now be understood that the user adjusts length and width of cooler cart 10 by loosening wing nuts 40 and sliding carriage bolts 34 along channels 32. Once the desired length and width are established, wing nuts 40 are tightened to secure carriage bolts 34 in place. Handle shaft 14 is raised from its lowered position by rotating it about hinge 18. The length of handle shaft 14 can be adjusted by pushing in handle retention pin 16 and sliding handle retention pin 16 to a different handle adjustment hole 38. At this point, the cooler cart 10 can be loaded and hauled by the user. Once the cooler cart 10 is no longer needed, the length and width of cooler cart 10 can be adjusted to their minimums by loosening wing nuts 40 and sliding carriage bolts 34 in channels 32. Wing nuts 40 are then tightened to maintain the desired length and width of cooler cart 10. The length of handle shaft 14 can also be adjusted to its minimum by depressing handle retention pin 16 and sliding it to the lowest handle adjustment hole 38. At this point, handle shaft 14 is lowered from its raised position by rotating it about hinge 18. Cooler cart 10 now occupies the, minimum amount of space possible and is ready for storage.

While a current embodiment of the cooler cart has been described in detail, it should be apparent that modifications Variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings find described in the specification are intended to be encompassed by the present invention. For example, any suitable sturdy material such as steel, aluminum, titanium, or carbon fiber composite may be used instead of the plastic handle, handle shaft, first end member, second end member, first side member, and second side member described. Also, the steel hinge may also be made of heavy-duty plastic, aluminum, or titanium. And although transporting coolers have been described, it should be appreciated that the cooler cart herein described is also suitable for transporting a wide variety of loads. Furthermore, a wide variety of wheels may be used instead of the caster-type wheels described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cooler cart comprising:
   a handle having opposing ends;
   a first end member having opposing ends, a middle, and a bottom, with said middle connected to said end of said handle;
   a first side member having opposing ends and a bottom, with one end connected to said end of said first end member;
   a second end member having opposing ends and a bottom, with one end connected to said opposing other end of said first side member;
   a second side member having opposing ends and a bottom, with one end connected to said opposing end of said second end member and said opposing end connected to said opposing end of said first end member, wherein said top edge and said front edge of said outer portion of said first end member, said second end member, said first side member, and said second side member comprise flanges therein to enclose said inner portion of said first end member, said second end member, said first side member, and said second side member;
   a plurality of legs having opposing ends with one end connected to said bottom of said opposing ends of said first end member and said bottom of said end of said first side member and said bottom of said opposing end of said second side member; and
   a plurality of wheels connected to said bottom of said opposing ends of said second end member and said bottom of said opposing end of said first side member and said bottom of said end of said second side member.

2. The handle as defined in claim 1, wherein said handle is telescoping in nature.

3. The first end member as defined in claim 1, wherein said first end member is telescoping in nature.

4. The second end member as defined in claim 1, wherein said second end member is telescoping in nature.

5. The first side member as defined in claim 1, wherein said first side member is telescoping in nature.

6. The second side member as defined in claim 1, wherein said second side member is telescoping in nature.

7. The handle as defined in claim 1, wherein said handle is hingedly attached to said middle of said first end member.

8. The first end member as defined in claim 1, wherein said first end member is L-shaped in cross-section.

9. The second end member as defined in claim 1, wherein said second end member is L-shaped in cross-section.

10. The first side member as defined in claim 1, wherein said first side member is L-shaped in cross-section.

11. The second side member as defined in claim 1, wherein said second side member is L-shaped in cross-section.

12. A cooler cart comprising:
a telescoping handle shaft having opposing ends, a top portion, and a bottom portion;
a plurality of handle adjustment holes, wherein said bottom portion of said handle shaft comprises holes therein to comprise said handle adjustment holes;
a handle retention pin mounted inside said top portion of said handle shaft;
a handle mounted on said end of said handle shaft;
a hinge with opposing ends with one end connected to said opposing end of said handle shaft;
a telescoping first end member having an inner portion with a channel, wherein said inner portion of said first end member comprises a slot therein to comprise said channel, an outer portion with a top edge and a front edge, a middle, a bottom, and opposing ends with said middle connected to said opposing end of said hinge;
a telescoping first side member having an inner portion with a channel, wherein said inner portion of said first side member comprises a slot therein to comprise said channel, an outer portion with a top edge and a front edge, a bottom, and opposing ends with one end connected to said end of said first end member;
a telescoping second end member having an inner portion with a channel, wherein said inner portion of said second end member comprises a slot therein to comprise said channel, an outer portion with a top edge and a front edge, a bottom, and opposing ends with one end connected to said opposing end of said first side member;
a telescoping second side member having an inner portion with a channel, wherein said inner portion of said second side member comprises a slot therein to comprise said channel, an outer portion with a top edge and a front edge, a bottom, and opposing ends with one end connected to said opposing end of said second end member and said opposing end connected to said opposing end of said first end member, wherein said top edge and said front edge of said outer portion of said first end member, said second end member, said first side member, and said second side member comprise flanges therein to enclose said inner portion of said first end member, said second end member, said first side member, and said second side member;
a plurality of legs having opposing ends with one end connected to said bottom of said opposing ends of said first end member and said bottom of said end of said first side member and said bottom of said opposing end of said second side member;
a plurality of wheels connected to said bottom of said opposing ends of said second end member and said bottom of said opposing end of said first side member and said bottom of said end of said second side member;
a plurality of carriage bolts inserted through said channels; and
a plurality of wing nuts threadedly connected to said carriage bolts and securing said inner portion of said first end member, said second end member, said first side member, and said second side member against said outer portion of said first end member, said second end member, said first side member, and said second side member.

13. The wheels as defined in claim 12, wherein said wheels are of the castor type.

14. The cooler cart as defined in claim 12, further comprising a padded grip encircling said handle.

15. The first end member, second end member, first side member, and second side member as defined in claim 12, wherein said first end member, said second end member, said first side member, and said second side member are selected from the group consisting of plastic, aluminum, titanium, steel, and carbon fiber composite.

16. The handle shaft as defined in claim 12, wherein said handle shaft is selected from the group consisting of plastic, aluminum, titanium, steel, and carbon fiber composite.

17. The handle as defined in claim 12, wherein said handle is selected from the group consisting of plastic, aluminum, titanium, steel, and carbon fiber composite.

18. The handle retention pin as defined in claim 12, wherein said handle retention pin is spring-loaded.

19. A cooler cart comprising:
a telescoping handle shaft having opposing ends, a top portion, and a bottom portion;
a plurality of handle adjustment holes, wherein said bottom portion of said handle shaft comprises holes therein to comprise said handle adjustment holes;
a handle retention pin mounted inside said top portion of said handle shaft;
a handle having a top mounted on said end of said handle shaft;
a padded grip encircling said top of said handle;
a hinge with opposing ends with one end connected to said opposing end of said handle shaft;
a telescoping first side member having an inner portion with a channel, wherein said inner portion of said first side member comprises a slot therein to comprise said channel, an outer portion with a top edge and a front edge, a bottom, and opposing ends with one end connected to said end of said first end member;
a telescoping second end member having an inner portion with a channel, wherein said inner portion of said second end member comprises a slot therein to comprise said channel, an outer portion with a top edge and a front edge, a bottom, and opposing ends with one end connected to said opposing end of said first side member;
a telescoping second side member having an inner portion with a channel, wherein said inner portion of said second side member comprises a slot therein to comprise said channel, an outer portion with a top edge and a front edge, a bottom, and opposing ends with one end connected to said opposing end of said second end member and said opposing end connected to said opposing end of said first end member, wherein said top edge and said front edge of said outer portion of said first end member, said second end member, said first side member, and said second side member comprise flanges therein to enclose said inner portion of said first end member, said second end member, said first side member, and said second side member;
a plurality of wheels connected to said bottom of said opposing ends of said first end member and said bottom of said end of said first side member and said bottom of said opposing end of said second side member, and said bottom of said opposing ends of said second end member and said bottom of said opposing end of said first side member and said bottom of said end of said second side member;

a plurality of carriage bolts inserted through said channels; and a plurality of wing nuts threadedly connected to said carriage bolts and securing said inner portion of said first end member, said second end member, said first side member, and said second side member against said outer portion of said first end member, said second end member, said first side member, and said second side member.

* * * * *